May 24, 1927.
F. KESEL ET AL
MOUSE TRAP
Filed Dec. 10, 1926     2 Sheets-Sheet 1
1,630,123
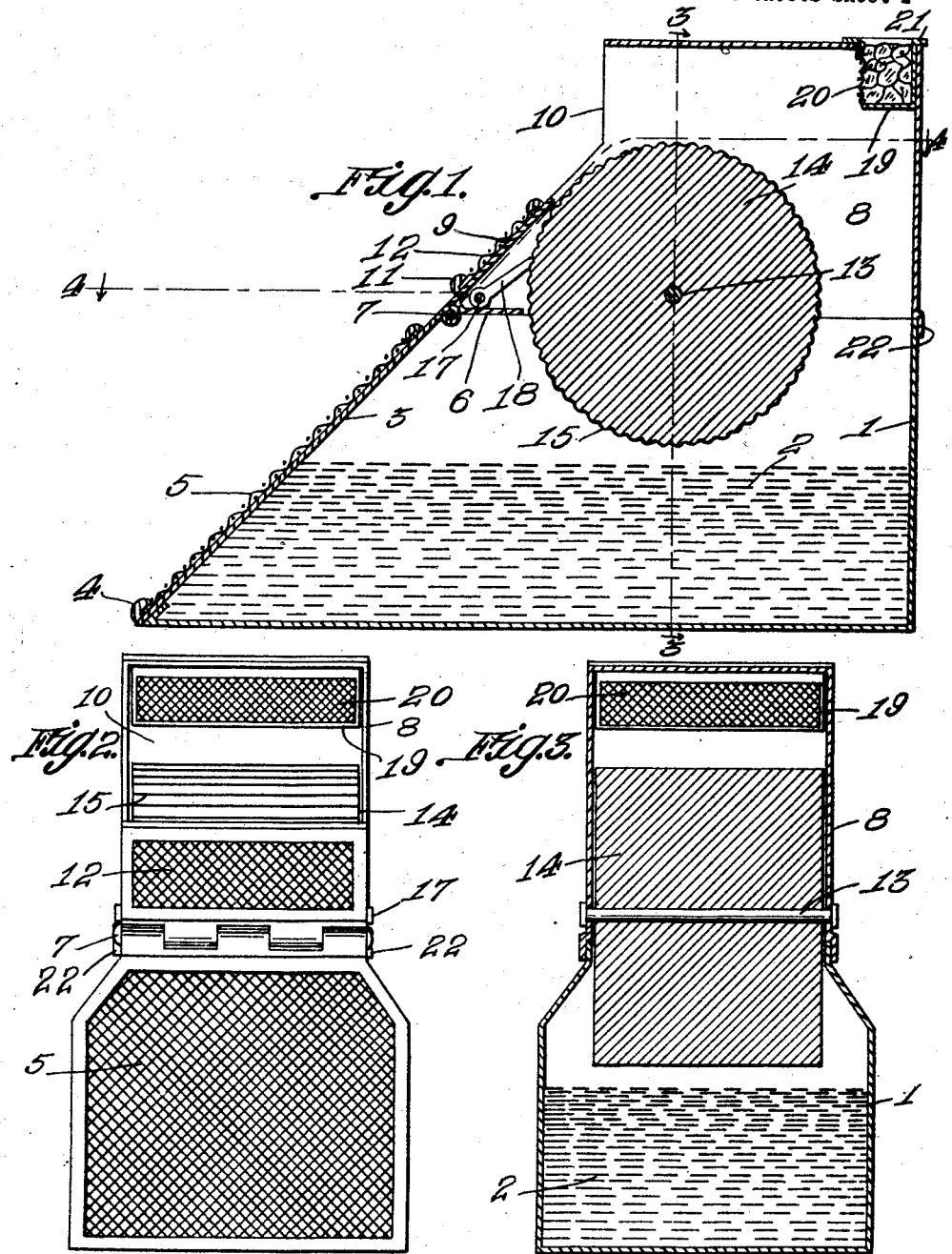

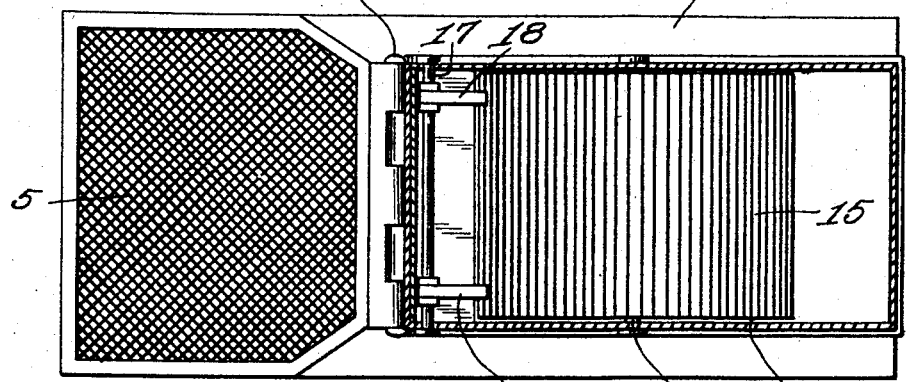
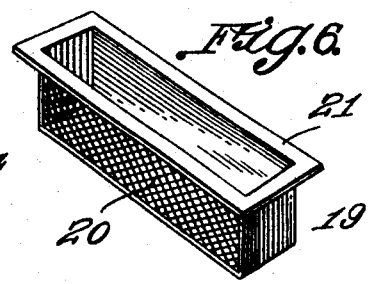
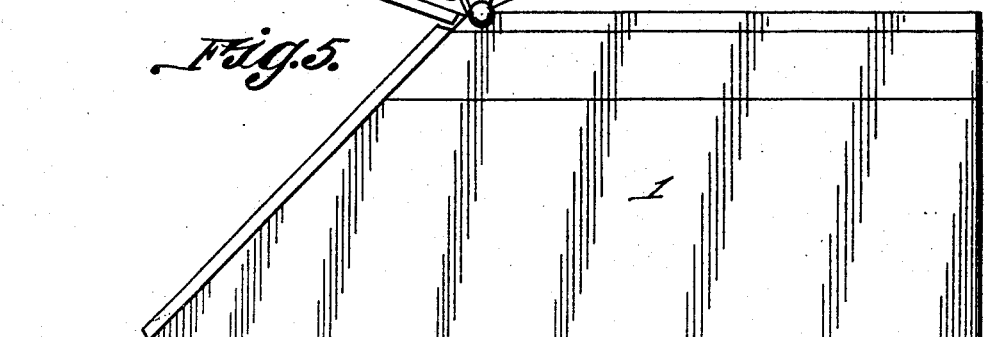

Patented May 24, 1927.

1,630,123

UNITED STATES PATENT OFFICE.

FRED KESEL AND GORDON NICHOLS, OF HONEOYE FALLS, NEW YORK.

MOUSE TRAP.

Application filed December 10, 1926. Serial No. 153,933.

Our present invention has reference to a rodent trap, and our object is the provision of a trap for this purpose wherein the rodent is attracted by a bait and in his attempt to reach the bait will travel onto a rotatable member which will revolve by the weight imparted thereon and submerge the rodent into a liquid for drowning the animal.

A further object is the provision of a mouse trap which includes a liquid receptacle having an inclined front which is roughened or which may be formed with a frame for a wire screen, there being hingedly connected to the front a top member that has the lower portion of its front inclined and roughened to align with the roughened front of the receptacle and the upper portion of the said front is open, said receptacle having arranged therein a corrugated cylinder that partly extends into the open portion of the top and also projects into the receptacle, there being means for holding the cylinder from turning in one direction, and the said top having, at the rear corner thereof a removable bait container, the construction being such that the animal attracted by the bait will travel over the inclined plane and onto the roller which revolving with the weight of the animal will plunge the latter into the liquid in the receptacle, so that trapped animals are drowned before the removal thereof and the removal of such animal is facilitated by the swinging of the top of the receptacle to open position.

To the attainment of the above broadly stated objects and others which will present themselves as the nature of the invention is better understood, the improvement also resides in certain other novel features of construction, combination and operative association of parts, a satisfactory embodiment of which is disclosed by the accompanying drawings.

In the drawings:

Figure 1 is a substantially central vertical longitudinal sectional view through a trap in accordance with this invention.

Figure 2 is a front elevation thereof.

Figure 3 is a sectional view on the line 3—3 of Figure 1.

Figure 4 is a sectional view on the line 4—4 of Figure 1.

Figure 5 is a side elevation but showing the top swung to open position on the liquid receptacle.

Figure 6 is a perspective view of the bait box.

The body of our improvement is preferably constructed of metal and includes a lower receptacle 1 that is designed for the reception of a liquid 2. The front 3 of the receptacle 1 is arranged at an inclination, and the outer face of the inclined front is roughened. To accomplish this there may be arranged on the outer face of the front 3 a frame 4 for a wire screen 5. The top of the receptacle 1 is open except for a horizontal partition 6 that extends from the front thereof, and hingedly secured, as at 7, to the front of the receptacle 1 there is the top member 8 of the improvement. The top is in the nature of a substantially rectangular member, the same, however, having its front from the lower portion thereof, inclined and arranged at the same angle as the front 3 of the receptacle 1, when the top is closed on the receptacle. The closed portion of the front of the top 8 is indicated for distinction by the numeral 9, and the open portion thereof by the numeral 10. The closed portion 9 of the top is roughened and to accomplish this the said part 9 may be provided with a frame 11 for a screen or mesh 12.

Having trunnions 13 which are received in bearing openings in the sides of the top 8 there is a cylinder 14. The cylinder may be of wood and has its periphery corrugated longitudinally, as at 15. Hingedly secured on a shaft 17 that extends transversely through the sides and adjacent the front portion 9 of the top 8 there are dogs 18 which engage with the corrugations 15 of the roller 14 and thus prevent the turning of the roller in one direction.

The top member 8 has an opening at the closed corner thereof for the reception of a bait box 19 best illustrated by Figure 6 of the drawings. The outer face of the bait box is open but is closed by a mesh 20. The top of the bait box is flanged, as at 21, and the said flanges rest on the top member 8. A suitable closure may be provided for the open top of the bait box if desired.

The improvement is designed for trapping small rodents such as mice and the height of the trap is such as to prevent the animals from obtaining access to the bait in the box 19 even when the box is left open. The animals will be attracted by the scent of the bait and will travel over the inclined planes or roughened fronts in their attempt to reach the bait. The animals will then travel onto the cylinder 14. After passing beyond the center of the cylinder the weight of the animals will cause the cylinder to be revolved and thereby precipitate the animals into the fluid 2 before they can reach the bait in the box. In this manner it will be seen that the animals are destroyed before being removed from the trap. The top is held positioned on the receptacle by suitable catch means and preferably the lower edges of the top are flanged, as at 22, for lapping engagement with the upper portion of the receptacle 1. The roller, as previously stated, cannot turn except in a direction to project an animal thereon into the liquid and the simplicity of our construction as well as the advantages thereof will, it is thought, be apparent to those skilled in the art to which the said invention relates when the foregoing specification has been carefully read in connection with the accompanying drawings.

Having described the invention, we claim:—

A mouse trap including a liquid receptacle having an inclined front, a frame thereon, a wire mesh having its edges secured in the frame, a top hingedly secured to the front of the receptacle and having depending flanges to embrace the sides and rear of the receptacle, said top having its front at the upper portion thereof open and the lower portion arranged at the same angle as the front of the receptacle, a frame on the closed front of the top, a mesh having its edges secured in said frame, a corrugated cylinder journaled in the top, and of a size to be projected above the closed front of the top, and partly into the receptacle, a horizontal partition between the closed front of the top and the cylinder, pivotally mounted dogs engaging the cylinder for holding the same from turning in one direction, and a flanged bait box removably received in the rear upper corner of the top and having a reticulated outer face.

In testimony whereof we affix our signatures.

FRED KESEL.
GORDON NICHOLS.